(12) United States Patent
Smith et al.

(10) Patent No.: US 9,474,345 B2
(45) Date of Patent: Oct. 25, 2016

(54) MAGNETIC RELATED FEATURES OF A COVER FOR AN ELECTRONIC DEVICE

(71) Applicant: Apple Inc., Cupertino, CA (US)

(72) Inventors: Samuel G. Smith, Cupertino, CA (US); Taylor Harrison Gilbert, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/966,213

(22) Filed: Aug. 13, 2013

(65) Prior Publication Data

US 2015/0049426 A1 Feb. 19, 2015

(51) Int. Cl.
| | |
|---|---|
| *G06F 1/16* | (2006.01) |
| *A45C 11/00* | (2006.01) |
| *H01F 7/02* | (2006.01) |

(52) U.S. Cl.
CPC .............. *A45C 11/00* (2013.01); *G06F 1/1626* (2013.01); *G06F 1/1681* (2013.01); *H01F 7/0252* (2013.01); *A45C 2011/003* (2013.01); *A45C 2200/15* (2013.01)

(58) Field of Classification Search
CPC ............ A45C 11/00; H01F 7/02; G06F 1/16
USPC ............. 361/679.01–679.45, 679.55–679.61, 361/724–727, 728–747, 752–759, 361/796–837; 312/223.2, 7.1, 319.9, 333, 312/348.3, 222, 226
See application file for complete search history.

(56) References Cited

U.S. PATENT DOCUMENTS

| | | |
|---|---|---|
| 6,829,140 B2 | 12/2004 | Shimano et al. |
| 7,318,521 B2 | 1/2008 | Lau |
| 7,389,872 B2 | 6/2008 | Wheeler et al. |
| 7,541,907 B2 | 6/2009 | Wang et al. |
| 7,561,415 B2 | 7/2009 | Liou et al. |
| 7,584,841 B2 | 9/2009 | Chan et al. |
| 8,132,670 B1 | 3/2012 | Chen |
| 8,143,982 B1 | 3/2012 | Lauder et al. |
| 8,143,983 B1 | 3/2012 | Lauder et al. |
| 8,235,208 B2 | 8/2012 | Sirichai et al. |
| 8,242,868 B2 | 8/2012 | Lauder et al. |
| 8,253,518 B2 | 8/2012 | Lauder et al. |
| 8,264,310 B2 | 9/2012 | Lauder et al. |
| 8,289,115 B2 | 10/2012 | Cretella, Jr. et al. |

(Continued)

FOREIGN PATENT DOCUMENTS

| | | |
|---|---|---|
| CN | 1838859 A | 9/2006 |
| CN | 2860010 Y | 1/2007 |

(Continued)

OTHER PUBLICATIONS

International Search Report and Written Opinion mailed Nov. 10, 2014 for PCT Application No. PCT/US2014/047969.

(Continued)

*Primary Examiner* — Courtney Smith
*Assistant Examiner* — Rashen E Morrison
(74) *Attorney, Agent, or Firm* — Downey Brand LLP

(57) ABSTRACT

A cover is described that is magnetically attached to a tablet device. The cover includes at least as flap. In the described embodiment, the flap includes a plurality of segments. The cover includes a number of magnets formed into a number of magnetic arrangements that provide a number of useful features associated with the cover and the tablet device.

22 Claims, 13 Drawing Sheets

(56) References Cited

U.S. PATENT DOCUMENTS

| | | |
|---|---|---|
| 8,531,827 B2 | 9/2013 | Huang et al. |
| 8,746,446 B2 | 6/2014 | Chiang |
| 2004/0196045 A1 | 10/2004 | Larsen |
| 2005/0022403 A1* | 2/2005 | Moskowitz ......... A61M 27/006 33/355 R |
| 2006/0026850 A1* | 2/2006 | Goslee ................. G01C 17/38 33/357 |
| 2006/0031014 A1* | 2/2006 | Sato ..................... G01C 17/38 701/530 |
| 2006/0135226 A1 | 6/2006 | Won et al. |
| 2006/0213684 A1 | 9/2006 | Sakata |
| 2008/0278269 A1 | 11/2008 | Ramirez et al. |
| 2009/0128785 A1 | 5/2009 | Silverstein |
| 2009/0159763 A1 | 6/2009 | Kim |
| 2010/0016041 A1 | 1/2010 | Ying et al. |
| 2010/0045628 A1 | 2/2010 | Gettemy et al. |
| 2010/0238620 A1 | 9/2010 | Fish |
| 2010/0312509 A1* | 12/2010 | Patel ..................... G01C 17/38 702/92 |
| 2010/0324862 A1* | 12/2010 | Sato ..................... G01C 17/38 702/150 |
| 2011/0240448 A1 | 10/2011 | Springer et al. |
| 2011/0284420 A1 | 11/2011 | Sajid |
| 2011/0297566 A1 | 12/2011 | Gallagher et al. |
| 2011/0316655 A1 | 12/2011 | Mehraban et al. |
| 2012/0018324 A1 | 1/2012 | Hale |
| 2012/0037523 A1 | 2/2012 | Diebel et al. |
| 2012/0047686 A1 | 3/2012 | Hautamaki et al. |
| 2012/0066865 A1 | 3/2012 | Lauder et al. |
| 2012/0066873 A1 | 3/2012 | Lauder et al. |
| 2012/0068797 A1 | 3/2012 | Lauder et al. |
| 2012/0068798 A1 | 3/2012 | Lauder et al. |
| 2012/0068799 A1 | 3/2012 | Lauder et al. |
| 2012/0068919 A1 | 3/2012 | Lauder et al. |
| 2012/0068942 A1 | 3/2012 | Lauder et al. |
| 2012/0069502 A1 | 3/2012 | Lauder et al. |
| 2012/0069503 A1 | 3/2012 | Lauder et al. |
| 2012/0069540 A1 | 3/2012 | Lauder et al. |
| 2012/0072167 A1* | 3/2012 | Cretella, Jr. .......... G06F 1/1626 702/150 |
| 2012/0194308 A1* | 8/2012 | Lauder ................. G06F 1/1626 335/219 |
| 2012/0194448 A1* | 8/2012 | Rothkopf ............ A45C 13/002 345/173 |
| 2012/0211377 A1 | 8/2012 | Sajid |
| 2012/0308981 A1 | 12/2012 | Libin et al. |
| 2013/0003284 A1 | 1/2013 | Massaro et al. |
| 2013/0027867 A1 | 1/2013 | Lauder et al. |
| 2013/0063873 A1 | 3/2013 | Wodrich et al. |
| 2013/0076614 A1 | 3/2013 | Ive et al. |
| 2013/0104410 A1* | 5/2013 | Wade ..................... G01C 21/00 33/361 |
| 2013/0149964 A1 | 6/2013 | Kreiner |
| 2015/0049426 A1* | 2/2015 | Smith ................... A45C 11/00 361/679.27 |

FOREIGN PATENT DOCUMENTS

| | | |
|---|---|---|
| CN | 1996118 A | 7/2007 |
| CN | 101776815 A | 7/2010 |
| WO | 2010/036090 | 4/2010 |
| WO | 2012/036711 | 3/2012 |
| WO | 2012/036714 | 3/2012 |
| WO | 2012/111994 | 8/2012 |

OTHER PUBLICATIONS

International Search Report & Written Opinion mailed Nov. 25, 2013 in PCT/US2013/052790.

CaseCrown Bold Trifold case for Samsung Galaxy Tab 10.1, Aug. 1, 2011. See http://www.zimbio.com/New+Mobile+Phones/articles/GpljMn4OveD/37+Off+CaseCrown+Bold+Trifold+case+Samsung.

Chinese Application for Invention No. 201310537499.5—First Office Action dated Dec. 28, 2015.

* cited by examiner

US 9,474,345 B2

MAGNETIC RELATED FEATURES OF A COVER FOR AN ELECTRONIC DEVICE

FIELD OF THE DESCRIBED EMBODIMENTS

The described embodiments generally relate to portable electronic devices. More particularly, the present embodiments describe various releasable attachment techniques well suited for portable electronic devices.

DESCRIPTION OF THE RELATED ART

Recent advances in portable computing includes the introduction of hand held electronic devices and computing platforms along the lines of the iPad™ tablet manufactured by Apple Inc. of Cupertino, Calif. These handheld computing devices can be configured such that a substantial portion of the electronic device takes the form of a display assembly used for presenting visual content. The display assembly generally includes an active display area configured to present visual content and a top protective layer used to provide protection against external effects, such as would be expected during normal use. However, in some cases, additional protection can be afforded both the tablet device and display assembly using a separate accessory device that takes the form of a protective cover attached to the tablet device. However, due to the relatively large size of the display in relation to the tablet device as a whole, little space is available for attaching the protective cover to the tablet device.

Moreover, conventional attachment mechanisms such as mechanical fasteners, clasps, and so forth typically require an externally accessible attaching feature on the electronic device to mate with a corresponding attaching feature on the accessory device. This arrangement can detract from the overall look and feel of the handheld computing device as well as add unwanted weight and complexity as well as degrade the appearance of the hand held computing device.

SUMMARY OF THE DESCRIBED EMBODIMENTS

This paper describes various embodiments that relate to a system, method, and apparatus for releasably attaching an accessory to an electronic device.

A cover is described. The cover includes at least a flap having a plurality of magnets arrayed along a first edge of the flap and configured to provide a first magnetic field and a field shaping magnet in proximity to the plurality of magnets configured to provide a second magnetic field that compensates for the first magnetic field to reduce a magnetic offset at a selected location on the flap to a pre-determined magnetic offset value.

A consumer system is described. The consumer system includes at least a tablet device with a housing having a front opening, a display assembly disposed within the front opening that includes a display, and a top protective layer disposed adjacent to the display. A plurality of magnetic sensors, and a magnetic attachment unit disposed within and secured to an inside side wall of the housing. A cover, that includes a flap formed of a first material and having a size and shape in accordance with the display, an integral hinge assembly that includes a flexible hinge, the flexible hinge formed of a continuous layer of the first material of the flap, a hinge magnetic attachment unit configured to activate the magnetic attachment unit causing the tablet device and the cover to magnetically attach to each other, and a plurality of magnets some of which are detectable by corresponding ones of the plurality of sensors only when the flap is in full contact with the top protective layer and each having a size and shape in accordance with an amount of pivoting motion that the flap undergoes during use in the fully closed configuration such that the magnets remain detectable by the corresponding sensors throughout the pivoting motion.

A magnetic attachment mechanism disposed within a housing of an electronic device suitable for releasably attaching an accessory device to the electronic device is described. The magnetic attachment mechanism includes at least a plurality of paired magnetic elements having a body formed of a magnetizable material having a shape that conforms to an interior surface of the housing, wherein the plurality of paired magnetic elements are magnetized in situ such that a first portion of the body comprises a first magnetic polarity and a second portion of the body is a second magnetic polarity, opposite the first magnetic polarity.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF SELECTED EMBODIMENTS

Figure 1:
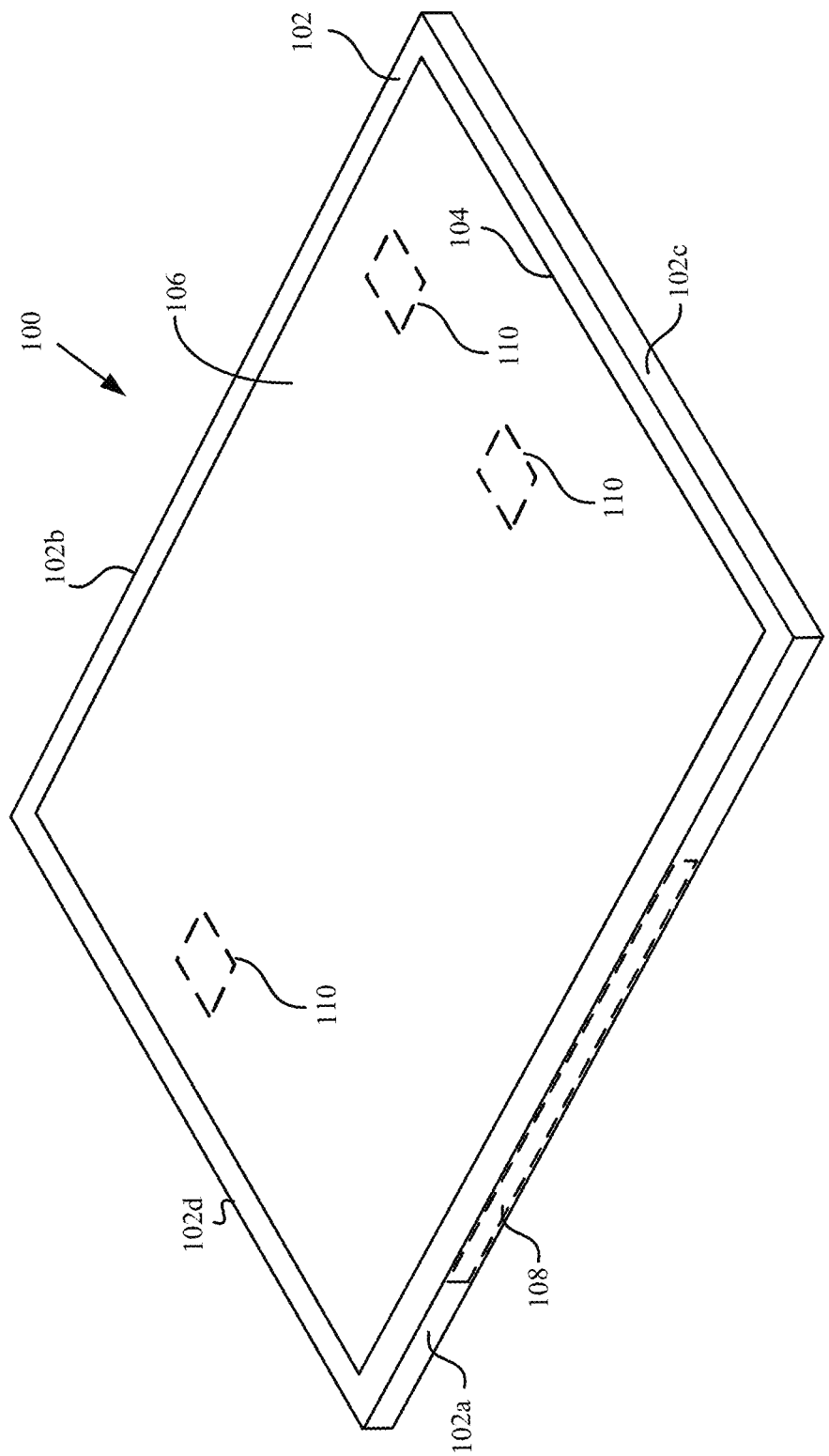
FIG. 1 shows a first perspective view of the electronic device in the form of a tablet device and the accessory device in the form of a protective cover.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following description relates in general to a mechanism that can be used to attach together at least two suitably configured objects. In one embodiment, this can be accomplished without the use of conventional fasteners. Each of the objects can include an attachment feature arranged to provide a magnetic field having appropriate properties. When the attachment features are brought into proximity with each other, the magnetic fields can cooperatively interact based upon their respective properties, result in the objects magnetically attaching to each other in a desired and repeatable manner. For example, due at least in part to the cooperative nature of the interaction of the magnetic fields, the objects can attach to each other in a pre-determined position and relative orientation without external intervention. For example, the cooperative magnetic interaction can result in the objects self-aligning and self-centering in a desired orientation.

The objects can remain in the magnetically attached state if and until a releasing force of sufficient magnitude is applied that overcomes the overall net attractive magnetic force. In some cases, however, it can be desirable to detach the objects serially (along the lines of a zipper) in which case, the releasing force only need be of sufficient magnitude to overcome the net magnetic attractive force of one pair of magnetic elements at a time. Connectors such as mechanical fasteners are not required to attach the objects together. Furthermore, to prevent interference to the magnetic interaction between the magnetic attachment features, at least a portion of the objects in the vicinity of the magnetic attachment features can be formed of magnetically inactive materials such as plastic or non-ferrous metals such as aluminum or non-magnetic stainless steel.

The objects can take many forms and perform many functions. In one embodiment, at least one object can be used as an accessory device. The accessory device can be magnetically attached to at least one electronic device having a relatively large display in proportion to the overall size of the electronic device (a tablet device is one example). The accessory device can provide services and functions that can be used to enhance the operability of the electronic device. For example, the accessory device can take the form of a protective cover that can be magnetically attached to the electronic device. The protective cover can provide protection to certain aspects (such as a display) of the electronic device while enhancing the overall look and feel of the electronic device. The protective cover can also provide support features that enhance a user interaction with the electronic device. For example, the protective cover can be folded into a shape(s) that can support the electronic device in a various display modes. One such display mode can position the display at an angle with respect to a horizontal support surface that is optimal for presentation of video content by the display.

The protective cover can include at least a flexible hinge portion. The flexible hinge portion can include a flexible body that, in turn, incorporates a magnetic attachment mechanism that can include a plurality of magnets. A magnetic field provided by the magnets can interact with a corresponding magnetic field provided by magnets in the electronic device to magnetically attach the protective cover and the electronic device in a specific orientation and relative position. In other words, the magnetic attachment mechanism can provide both coarse and fine alignment between the protective cover and the electronic device. The protective cover can include a flap that is connected to the flexible hinge portion arranged to smoothly rotate about a pivot line. In one embodiment, the flap can rotate 180° in a first direction towards the display and can rotate 180° in second direction opposite the first direction away from the display. When magnetically coupled to the electronic device, the smooth rotation of the flap about the pivot line in the first direction can bring the flap in contact with the display whereas smooth rotation about the pivot line in the second direction can bring at least a portion of the flap in contact with a rear portion of the electronic device. The protective cover can overlay all or portions of the display depending upon a folded configuration. For example, in a first folded configuration, the protective cover can be folded in a manner that a portion of the display is uncovered and therefore viewable. The flap can be segmented by which it is meant that the flap can be divided into distinct portions that can fold and bend with respect to each other as well as the electronic device and in particular, the display. In this way, the segmented flap affords an additional option of revealing only specific portions of the display by folding individual segments to reveal a corresponding portion of the display while other segments remain in contact and therefore obscuring corresponding portions of the display.

In some embodiments, the flap can include a variety of magnets that can be used to form a number of structures well suited for use with the electronic device. For example, the flap can include a first plurality of magnets arrayed along a first edge (i.e., first edge magnets) and a second plurality of magnets positioned in corresponding locations along a second edge opposite the first edge (second edge magnets). In a particular embodiment, corresponding ones of the first and second edge magnets have polarities that cooperate with each other to form magnetic circuits. In this way, when the first edge and the second edge are brought into spatial proximity to each other, magnetic fields of the first and second edge magnets interact with each other to form a magnetic circuit that efficiently provides a magnetic attractive force that causes the first and second edges to attach to each other. In this way, the flap can form a structure that can be used to enhance the functionality of the cover with regards to the electronic device.

For example, if the flap is constructed to have three independently foldable segments (referred to as segment A, segment B, and segment C) where segment A is attached to a magnetic hinge assembly and segment C is opposite segment A. A triangular structure ABC can be formed when the first edge magnets and the second edge magnets attract each other when segment A is within proximity to segment C. It should be noted that the properties of the triangular structure ABC can vary in accordance with the relative sizes of the segments A, B, and C. In other words, is segments A, B, and C are about equal in width, then triangular structure ABC can take the form of an equilateral triangle, whereas if two segments are about of equal width, then the triangular structure ABC can take on the shape of an isosceles triangle. It should be noted that in some embodiments, the triangular structure can be used to present the display at an angle of about 5-15° in a keyboard mode well suited for using a keyboard presented at the display or about 65-80° in a movie mode well suited for viewing visual content presented at the display at a comfortable viewing angle.

In one embodiment, the flap can include electronic circuits or other elements (passive or active) that can cooperate with electronic elements in the electronic device. As part of that cooperation, signals can be passed between the protective cover and the electronic device that can, for example, be used to modify operations of the electronic device, operations of electronic circuits or elements of the protective cover, and so forth. As an example, the electronic device can include one or more magnetically sensitive circuits such as a Hall Effect sensor and as such can detect the presence of a magnetic field. The Hall Effect sensor can respond to properties of a magnetic field (such as the presence of magnetic field, a magnetic field strength, polarity, etc.) by generating a signal. The signal can be used to alter an operating state of the electronic device. The electronic device can also include optical sensors such as an ambient light sensor (ALS) configured to detect photons from an ambient light source.

Accordingly, the protective cover can include a magnetic element, or elements, such as a permanent magnet having a magnetic field that can be detected the Hall Effect sensor to generate the signal. The magnet(s) can be positioned in the protective cover in various locations in the flap that can be detected by the magnetic sensors when the magnets are proximate to the corresponding magnetic sensor. The magnetic sensors can send information to a processor in the electronic device that can evaluate the signals from the multiple sensors. The evaluation of the signals from the sensors can provide the processor with information that can be used to determine a spatial relationship between the flap and the electronic device or even if the protective cover is attached to the electronic device. For example, the processor can use the signals from the sensors to indicate a relative position of the flap to the electronic device and in response alter an operating state of the electronic device accordingly. For example, when the signals indicate that the flap is fully closed (if, for example, one or another or both (if more than one sensor is present) magnetic sensors detect a corresponding magnetic field), then the processor can prevent the display from presenting visual content. On the other hand, if one sensor detects the corresponding magnetic field and the other sensor does not detect the corresponding magnetic field, then the processor can use this information to determine that only a portion of the display is viewable (that portion of the display corresponding to the portion of the flap having the magnet that is not detectable by the sensor). In this situation, the processor can cause the display to present visual content at only the viewable portion of the display.

These and other embodiments are discussed below with reference to FIGS. 1-16. However, those skilled in the art will readily appreciate that the detailed description given herein with respect to these figures is for explanatory purposes only and should not be construed as limiting. For the remainder of this discussion, a first and second object each suitably configured to magnetically attach to each other in accordance with the described embodiments will be described. It should be noted, however, that any number and type of suitably configured objects can be magnetically attached to each other in a precise and repeatable manner. In particular, for simplicity and clarity, for the remainder of this discussion, the first object is presumed to take the form of an electronic device and in particular a handheld electronic device. The handheld electronic device can, in turn, take the form of a tablet computer or device, portable media player, and so forth. It should be noted that in the context of this discussion, the term magnets can refer to both permanent magnets, magnetizable material, and magnetically attractable material (such as steel) having little or no net magnetization but can nonetheless form part of a magnetic circuit.

FIG. 1 shows a top perspective view of electronic device 100 in accordance with the described embodiments. Electronic device 100 can process data and more particularly media data such as audio, visual, images, etc. By way of example, electronic device 100 can generally correspond to a device that can perform as a smart phone, a music player, a game player, a visual player, a personal digital assistant (PDA), a tablet computer and the like. Electronic device 100 can also be hand held. With regards to being handheld, electronic device 100 can be held in one hand while being operated by the other hand (i.e., no reference surface such as a desktop is needed). Hence, electronic device 100 can be held in one hand while operational input commands can be provided by the other hand. The operational input commands can include operating a volume switch, a hold switch, or by providing inputs to a touch sensitive surface such as a touch sensitive display device or a touch pad.

Electronic device 100 can include housing 102. In some embodiments, housing 102 can take the form of a single piece housing formed of any number of materials such as plastic or non-magnetic metal which can be forged, molded, or otherwise formed into a desired shape. In those cases where electronic device 100 has a metal housing and incorporates radio frequency (RF) based functionality, a portion of housing 102 can include radio transparent materials such as ceramic, or plastic. Housing 102 can be configured to enclose a number of internal components. For example, housing 102 can enclose and support various structural and electrical components (including integrated circuit chips) to provide computing operations for electronic device 100. The integrated circuits can take the form of chips, chip sets, or modules any of which can be surface mounted to a printed circuit board, or PCB, or other support structure. For example, a main logic board (MLB) can have integrated circuits mounted thereon that can include at least a microprocessor, semi-conductor memory (such as FLASH), and various support circuits and so on. Housing 102 can include opening 104 for placing internal components and as necessary can be sized to accommodate display assembly for presenting visual content, the display assembly being covered and protected by protective layer 106. In some cases, the display assembly can be touch sensitive allowing tactile inputs that can be used to provide control signals to electronic device 100. In some cases, the display assembly may be a large prominent display area that covers a majority of the real estate on the front of the electronic device.

Electronic device 100 can include a magnetic attachment system that can be used to magnetically attach electronic device 100 to at least one other suitably configured object. The magnetic attachment system can include a number of magnetic attachment features distributed within and in some cases connected to housing 102. For example, the magnetic attachment system can include magnets 108. In particular, magnets 108 can be located in proximity to side-wall 102a of housing 102. In some embodiments, electronic device 100 can include sensors 110. Sensors 110 can take many forms capable of detecting or otherwise reacting to a particular external stimulus. For example, sensors 110 can be sensitive to an external magnetic field (Hall Effect sensor, or HFX) as well as a magnetometer that can be used to detect the Earth's magnetic field and as such function as a compass. Sensors 110 can be sensitive to externally sourced light, such as ambient light, as well as audio energy, heat energy and so on that can be used by electronic device 100 in any combination. Generally sensors 110 are in communication with a processor or other circuits disposed within electronic device 100 in such a way that operation of electronic device 100 can be affected by information associated with sensors 110. The sensor information can be affirmative in nature (i.e., detection of an external stimulus) or passive in nature (i.e., external stimulus of a particular nature is not detected) either or which taken singly or in combination can provide useful information to electronic device 100 that can be used, for example, in modifying an operation of electronic device 100.

Figure 2:
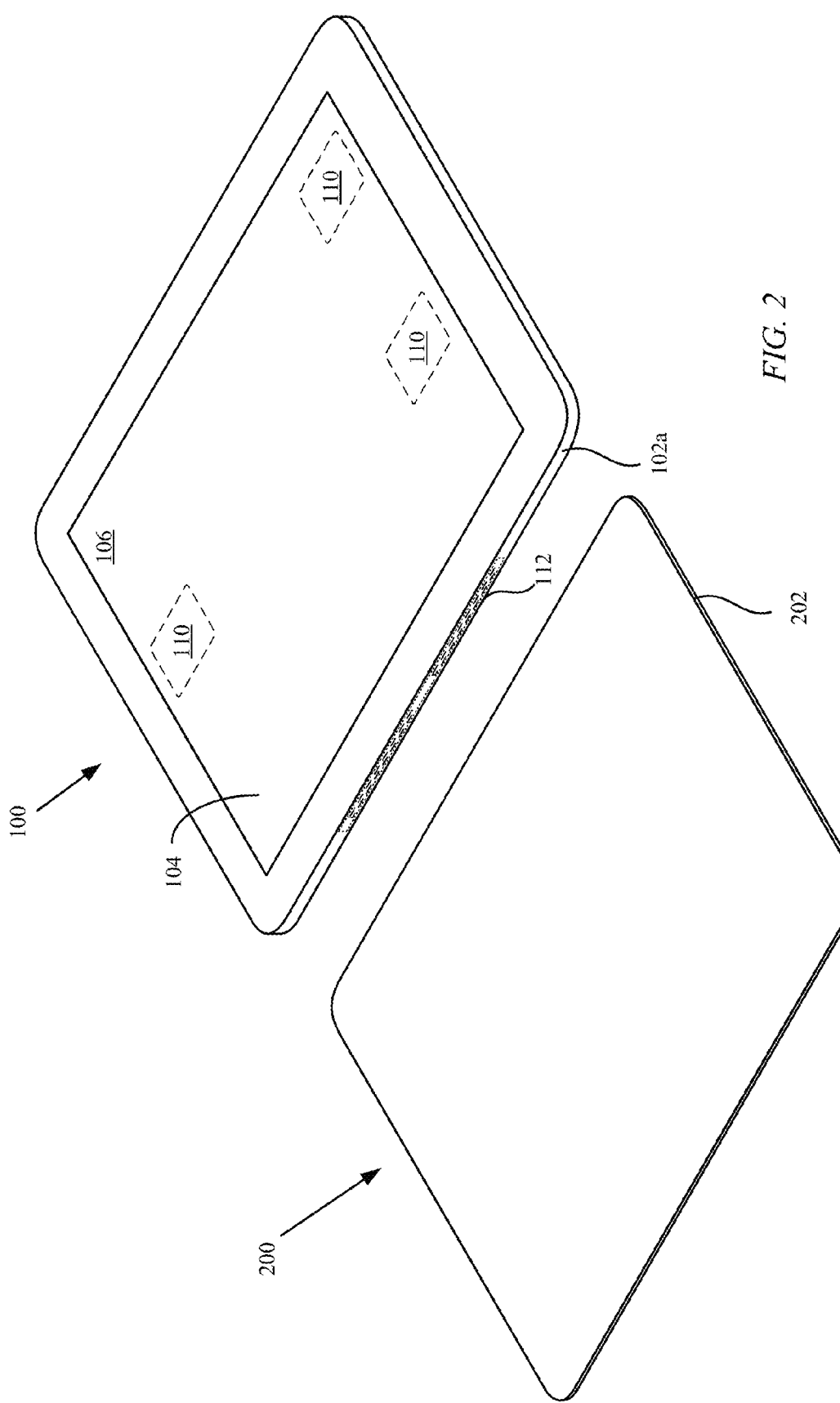
FIG. 2 shows a second perspective view of the electronic device in the form of a tablet device and the accessory device in the form of a protective cover.

The remainder of this discussion will describe particular embodiments of devices that can use the magnetic attachment system. In particular, FIG. 2 shows perspective view of electronic device 100 (hereinafter referred to as tablet device 100) and accessory device 200 (hereinafter referred to as cover 200) individually and magnetically attached to each other as consumer product system 300 in FIG. 3. FIG. 2 shows magnetic surface 112 at an exterior surface of side 102a provided by magnets 108. In an unattached state, magnetic surface 112 does not exhibit sufficient intensity at an exterior surface of side-wall 102a to adversely affect sensitive magnetic components in the proximity thereof. Accordingly, in the unattached state (or inactive mode), a magnetic field associated with magnetic surface 112 does not exceed magnetic threshold $B_{threshold}$ above which magnetically sensitive devices (such as a credit card magnetic strip) can be affected. Cover 200 can include flap 202 having a size and shape in accordance with tablet device 100. Magnetic hinge assembly 204 (shown in FIG. 3) can be used to magnetically attach cover 200 to tablet device 100 in cooperation with magnetic surface 112.

Figure 3:
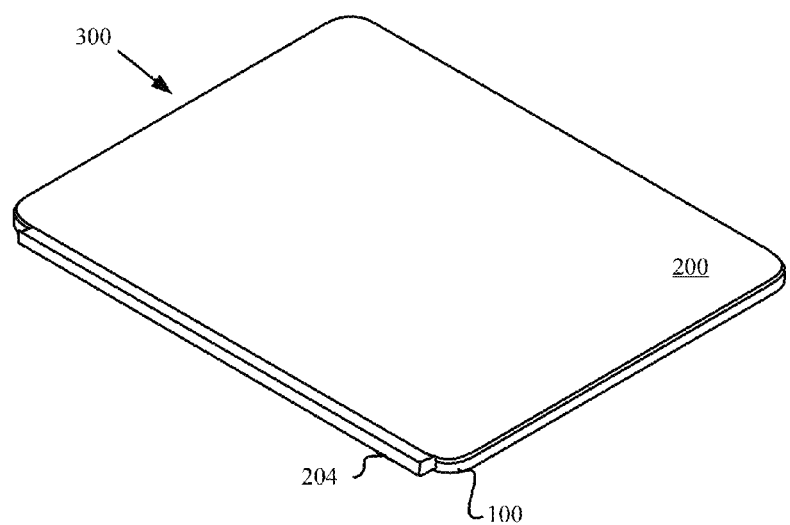
FIG. 3 shows a closed configuration.
Figure 4:
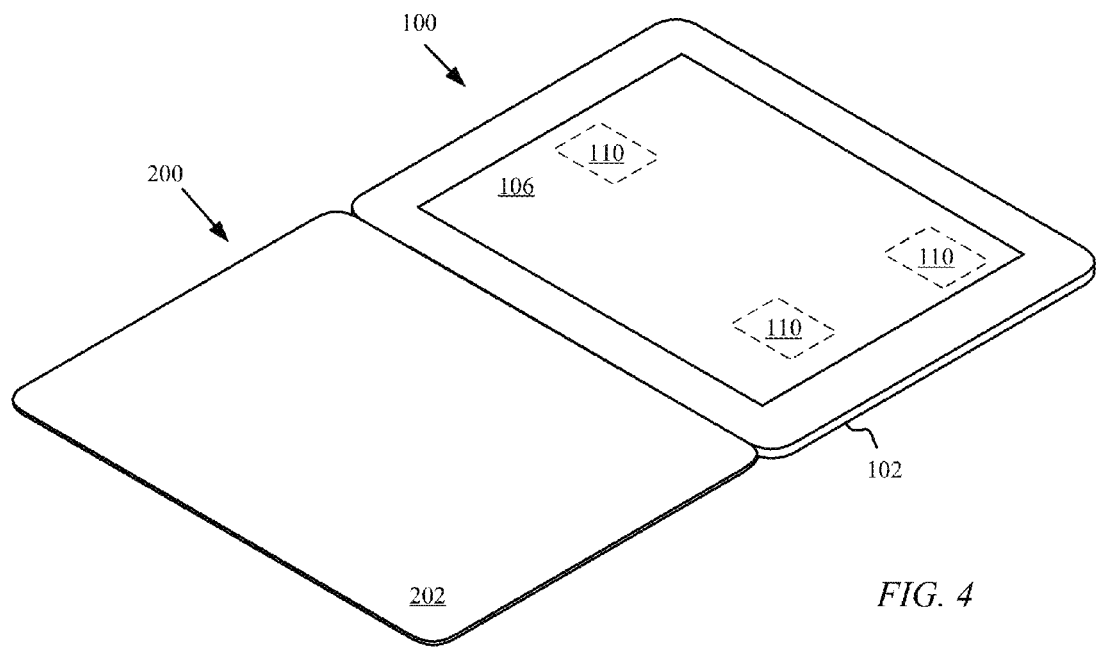
FIG. 4 shows an open configuration.

FIG. 3 shows consumer product system 300 in accordance with the described embodiments in which cover 200 is magnetically attached to tablet device 100 at hinge assembly 204. Magnetic hinge assembly 204 can include magnetic elements (not shown) that form a magnetic field that interacts with magnetic surface 112 to form a magnetic attractive force strong enough to attach cover 200 and electronic device 100. FIG. 3 shows cover 200 in fully closed configuration with respect to electronic device 100. In this arrangement, substantially all of protective layer 106 is overlaid by cover 200. On the other hand, FIG. 4 shows cover assembly 300 in an open configuration in which protective layer 106 is fully viewable.

Figure 5:
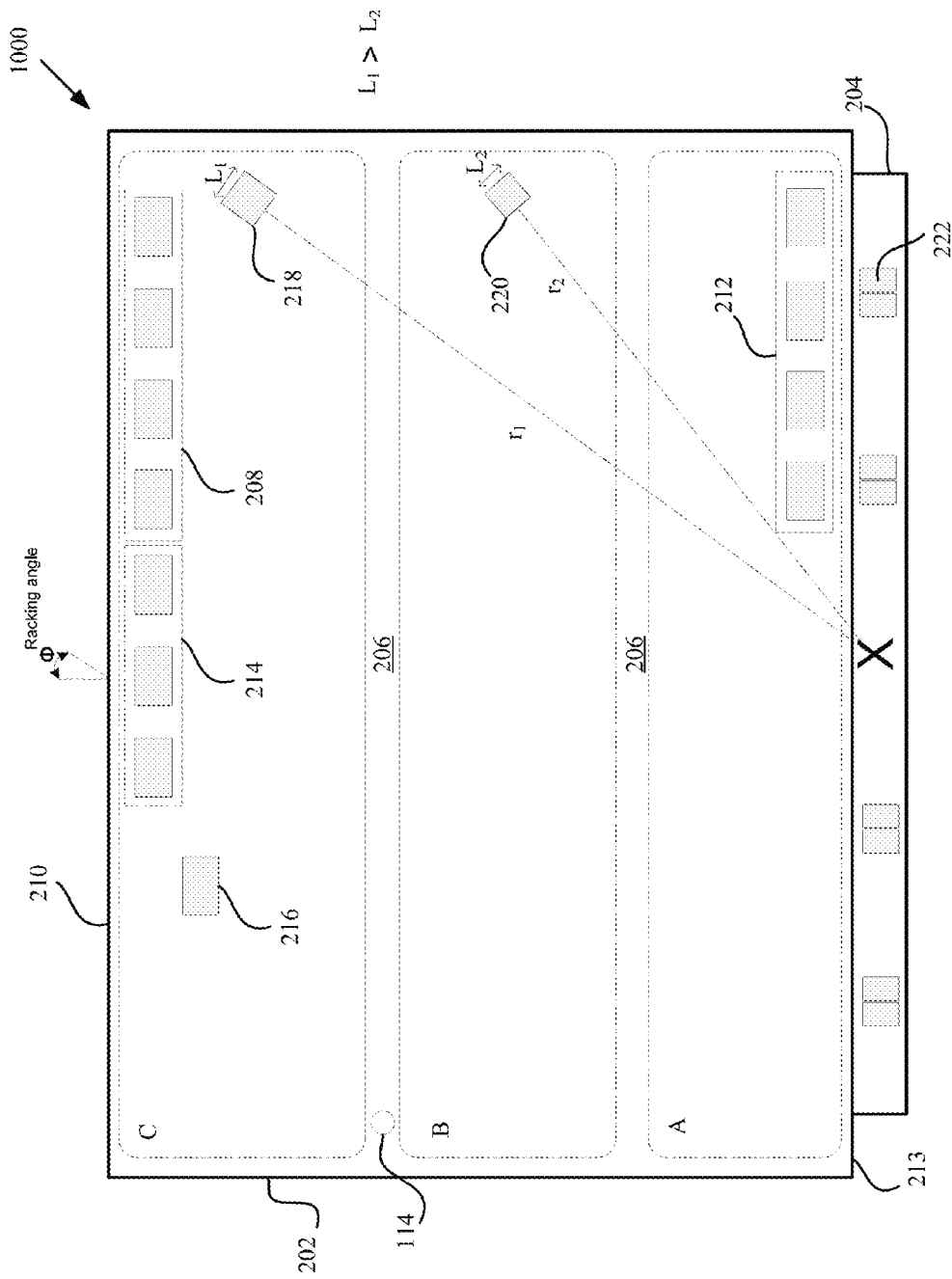
FIG. 5 shows a top view of an embodiment of a cover assembly.
Figure 6:
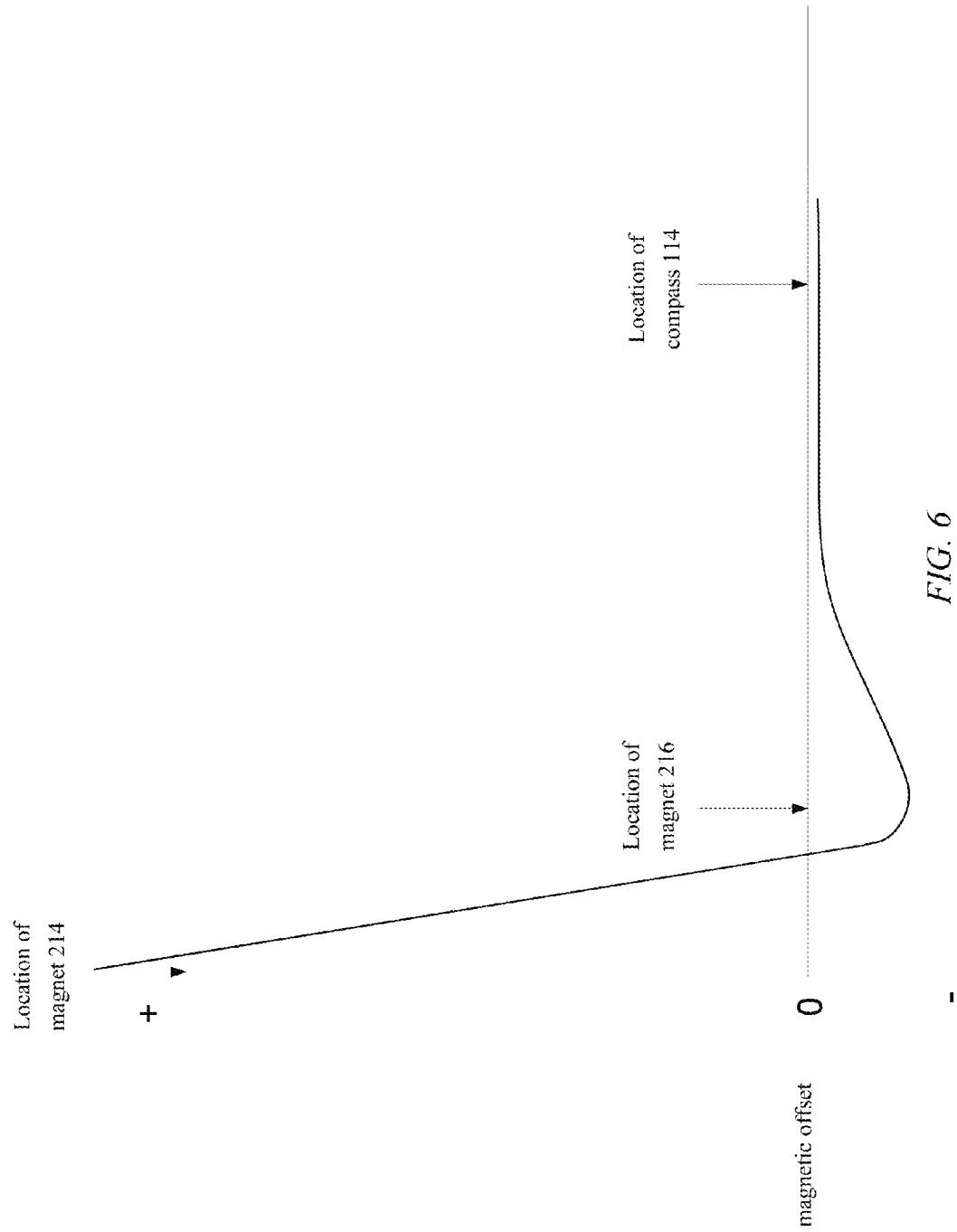
FIG. 6 graphically illustrates a relationship of magnetic offset and distance in accordance with the described embodiments.

In some embodiments, flap 202 can be unitary in appearance by which it is meant that flap 202 can appear as a single unit such that flap 202 can bend slightly if formed of flexible material. However, in other cases, flap 202 can include a number of segments joined to adjacent segments by associated folding regions that permit the segments to fold independently of each other as well as with respect to tablet device 100. Accordingly, FIG. 5 shows a top view of a specific embodiment of cover 200 in which body 202 has a size and shape in accordance with protective layer 106. Body 202 can be formed from a single piece of foldable or pliable material. Body 202 can also be divided into segments separated from each other by a folding region. In this way, the segments can be folded with respect to each other at the folding regions.

In one embodiment, body 202 can be formed of layers of material attached to one another forming a laminate structure. Each layer can take the form of a single piece of material that can have a size and shape in conformance with body 202. Each layer can also have a size and shape that correspond to only a portion of body 202. For example, a layer of rigid or semi-rigid material about the same size and shape of a segment can be attached to or otherwise associated with the segment. In another example, a layer of rigid or semi-rigid material having a size and shape in accordance with body 202 can be used to provide cover 200 as a whole with a resilient foundation. It should be noted that the layers can each be formed of materials having desired properties. For example, an interior surface of cover 200 that comes in contact with delicate surfaces such as glass can be formed of a soft material that will mar or otherwise damage the delicate surface. In another embodiment, a material such as microfiber can be used that can passively clean the delicate surface. On the other hand, a layer that is exposed to the external environment can be formed of a more rugged and durable material such as plastic or leather.

In a specific embodiment, body 202 can be partitioned into a number of segments that can be widely varied. In the embodiment shown in FIG. 5, body 202 can be partitioned into three segments, segments A, B, and C each coupled to an adjacent segment by thinner, foldable portions 206. Each of the segments A, B, C can include one or more inserts disposed therein. By way of example, the segments can include a pocket region where the inserts are placed or alternatively the inserts may be embedded within the segments (e.g., insert molding). If pockets used, the pocket region can have a size and shape to accommodate corresponding inserts. The inserts can have various shapes but are most typically shaped to conform to the overall look of body 202 (e.g., rectangular). The inserts can be used to provide structural support for body 202. That is, the inserts can provide stiffness to the cover assembly. In some cases, the inserts may be referred to as stiffeners. As such, cover 200 is relatively stiff except along the foldable regions that are thinner and do not include the inserts (e.g., allows folding) making segmented cover 200 more robust and easier to handle. In one embodiment segments A, B, C can have a size relationship to each other such that a segments A, B, C can co-operate to form a triangular support structure. The triangular support structure can be used to enhance a user experience of tablet device 100.

For example, a triangular structure can be formed by coupling segment A and segment C (using magnets as described below or simply friction coupling). It should be noted that the properties of the triangular structure can vary in accordance with the relative sizes of the segments A, B, and C. In other words, when segments A, B, and C are about equal in width, then the triangular structure can take the form of an equilateral triangle, whereas when two segments are about of equal width, then the triangular structure can take on the shape of an isosceles triangle. In this way, the triangular structure can be shaped for a particular purpose. For example, in one configuration the triangular structure can be used to support tablet device 100 in a movie mode or in a keyboard mode.

In one embodiment, body 202 can include a number of magnets some of which can be used to form the triangular structure. For example, segment C can include first edge attach magnets 208 arrayed along first edge 210 of body 202 whereas segment A can include second edge attach magnets 212 at second edge 213 opposite to first edge 210 and adjacent to magnetic hinge assembly 204. In this embodiment, first edge attach magnets 208 and second edge attach magnets 212 have a one to one correspondence in which each first edge attach magnet 208 can be associated with a corresponding one of second edge attach magnets 212. Moreover, in order to create a maximum magnetic attractive force between first edge attach magnets 208 and second edge attach magnets 212, each magnet pair can exhibit opposite magnetic polarities. For example, when first edge attach magnets 208 are arranged in first polarity pattern $M_1\{P1, P2, P1, P2\}$, then second edge attach magnets 212 can be arranged in complementary polarity pattern $M_2\{P2, P1, P2, P1\}$. In this way, a maximum magnetic attachment force can be realized between the two magnetic arrays while minimizing magnetic fringe effects at the ends of the magnetic arrays. In one embodiment, first edge attach magnets 208 and second edge attach magnets 212 can be formed of neodymium (N45SH). It should be noted that the number of edge attach magnets can vary from as few as two to more than 16.

Flap 202 also includes flap attachment magnets 214 next to first edge attach magnets 208 and along first edge 210. In the described embodiment, flap attachment magnets 214 can be used to form a magnetic attachment with corresponding magnetic elements disposed within tablet device 100 (described below). In one embodiment, flap attachment magnets 214 can be used to magnetically attach flap 202 to protective layer 106 when flap 202 is in the fully closed configuration with respect to tablet device 100. Flap attachment magnets 214 can be used to magnetically attach flap 202 to a rear side of housing 102 by rotating flap 202 about a pivot line formed at magnetic hinge assembly 204. The rotation about the pivot line can bring an interior surface of flap 202 in contact with selected portions of the rear side of housing 102. Flap attachment magnets 214 can magnetically interact with the magnetic element disposed within housing 102 to magnetically attach flap 202 (or portions thereof) to the rear side of housing 102.

In some embodiments, sensors 110 can take the form of magnetometer 114 (relative position with respect to flap 202 shown in dashed circle in FIG. 5) that can be used as a magnetic compass for detecting a direction of an ambient magnetic field (such as that provided by the Earth). In order to accurately detect a current direction of the external magnetic field when flap 202 is in the closed configuration, compass 114 can be at least partially shielded from stray magnetic fields generated by magnets disposed within flap 202 and in particular magnets 208 and 214. Accordingly, field shaping magnets 216 can be placed in a position relative to compass 114 and magnets 208 and 214 that reduces a magnetic offset experienced by compass 114 to within an acceptable range of magnetic offset values. In particular, FIG. 6 graphically illustrates a relationship between magnetic offset as a function of distance from magnets 208 and 214. It should be noted that field shaping magnets 216 can have magnetic polarity(ies) that reduce magnetic offset at compass 114 to an offset value within an acceptable range. For example, field shaping magnets 216 can have a polarity that is opposite to that of magnets 214, magnets 208, or the effective combination thereof. In this way, magnetic offset at compass 114 is substantially reduced over that which would be experience if magnetic effects of magnets 208 and 214 were not compensated. In one embodiment, field shaping magnet 216 can maintain the magnetic offset at compass 114 from magnets 208 and 214 at a value on the order of 10° or less at a reference location.

Returning to FIG. 5, flap 202 can be used to form a triangular support structure. In one embodiment, the triangular support structure can be formed simply by using friction to couple segment A and segment C. By friction couple it is meant that surface friction created between segments A and C when brought in direct contact can be sufficient to maintain the triangular structure even when used to support tablet device 100 in the movie mode or the keyboard mode. Alternatively, the triangular structure can be formed by bringing first edge attach magnets 208 in proximity to second edge attach magnets 212 thereby forming a magnetic circuit. It should be noted that in some embodiments, first edge attach magnets 208 and second edge attach magnets 212 are not required to overlay one another but merely be in proximity separated by a distance from one another suitable for creating the magnetic circuit.

As discussed above, flap attach magnets 214 can cooperate with a corresponding magnetic element disposed within tablet device 100 to releasably attach flap 202 to protective layer 106. However, due in part to the flexible nature of the material used to form flap 202 and the distributed nature of the magnetic attachment between magnetic hinge assembly 204 and tablet device 100, a certain amount of "racking" can be experienced during ordinary use when flap 202 is magnetically attached to tablet device 100. By racking it is meant pivoting type movements of flap 202 about center of attachment X (being the center of magnetic attachment formed between magnetic hinge assembly 204 and tablet device 100). Accordingly, it can be expected that flap 202 can pivot about center of attachment X by racking angle $\phi$. However, in those situations where sensors 110 are configured to detect sensor magnets 218 and 220 when flap 202 is in the closed configuration, pivoting motion of flap 202 about center of attachment X can result in a displacement D of sensor magnets 218 and 220 in accordance with Eq. (1):

$$D_{218} = r_1 \times \phi$$

$$D_{220} = r_2 \times \phi \qquad \text{Eq. (1):}$$

where:

$D_{218}$, $D_{220}$ movement of magnets 218, 220 respectively due to racking of flap 202 by racking angle $\phi$; and $r_1$, $r_2$ are distance between center of attachment X and sensor magnets 218 and 220 respectively.

Accordingly, in order to prevent a false trigger (in which either or both magnets 218 and 220 move away from corresponding magnetic sensors 110 and are not detectable), magnets 218 and 220 can be sized in such a way that even at an expected maximum racking angle, magnetic sensors 110 can still be expected to detect the magnetic fields generated by magnets 218 and 220. In one embodiment, sensor magnet 218 can take the form of a square magnet having sides of $L_1$ whereas sensor magnet 220 can also take the form of a square magnet having sides of $L_2$ where $L_1 > L_2$ since $r_1$ is greater than $r_2$. In order to remain detectable by magnetic sensors 110, $L_1$ is generally greater than $D_{218}$ and $L_2$ is greater that $D_{220}$.

Flap 202 can magnetically attach to tablet device 100 using magnetic hinge assembly 204 that can include magnets 222. Magnetic hinge assembly 204 can be integrated in the sense that magnetic hinge assembly 204 can be integrally formed as part of cover 200. In some embodiments, magnetic hinge assembly 204 can be formed of the same material (fabric, leather, etc.) as is used to form a top portion of flap 202. In this way, the visual effect can be one of continuity when viewing flap 202. Further enhancing the sense of continuity is the wrap around nature of flexible hinge 204. By wrap around it is meant that material that forms body 202 (and in particular a top portion formed of fabric, for example) can continue beyond edge 214 (sometimes referred to as a tail) and wrap around magnets 222 achieving an appearance of continuity between flap 202 and magnetic hinge assembly 204.

Figure 7:
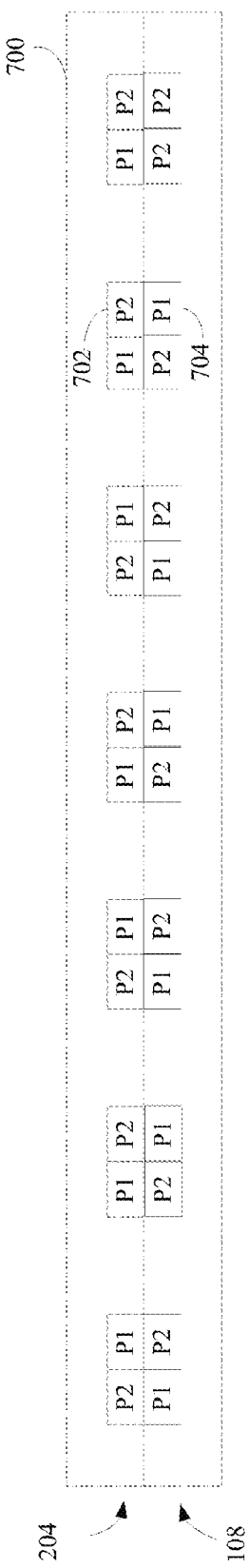
FIG. 7 shows a magnetic assembly in accordance with the described embodiments.
Figure 8:
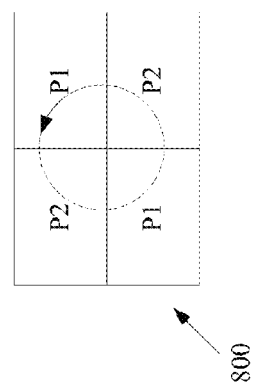
FIG. 8 shows a magnetic couplet forming a magnetic circuit in accordance with the described embodiments.

Magnetic hinge assembly 204 can include magnets 222 arranged in as magnetic pairs 700 shown in FIG. 7 and configured to magnetically attach to magnetic elements disposed within magnetic attachment feature 108 in tablet device 100. In one embodiment, magnetic pairs 700 can be arranged in as a magnetic array 702 that in one embodiment includes magnets paired by way of polarities into magnetic pairs 700 represented as magnetic array as follows:

{[P2,P1],[P1,P2],[P2,P1],[P1,P2],[P2,P1][P1,P2]
 [P2,P1]}

(where brackets [ ] indicate magnetic pairs).

Correspondingly, magnetic attachment feature 108 disposed in a tablet device can include a corresponding magnetic array 704 having magnetic pairs arranged in a manner that complements magnetic array 702. In one embodiment, magnetic array 702 and 704 when brought within proximity to each other, form a magnetic attraction by way of a series of magnetic circuits 800 illustrated in FIG. 8. A magnetic circuit can be used to increase a magnetic attraction force with a reduced amount of magnetic material, which in the case of rare earths such as neodymium, can be very advantageous. Accordingly, by varying the number of magnetic pairs and the distance (or pitch) between the magnetic pairs, an optimal ratio of magnetic material and overall magnetic attachment force can be achieved. It should be noted that in one embodiment, the magnets 222 can be magnetized after assembly of cover 200 is complete or at least completion of any requisite heat treatments. In this way, by waiting until after all heat treatments (or at least the most likely to cause de-magnetization), to magnetize magnets 222, the magnetic strength of magnets 222 can be maximized and therefore, the amount of magnetic material used to provide a pre-determined magnetic attachment force can be reduced over that which would be required if magnets 222 experience at least some de-magnetization during assembly heat treatments.

Figure 9:
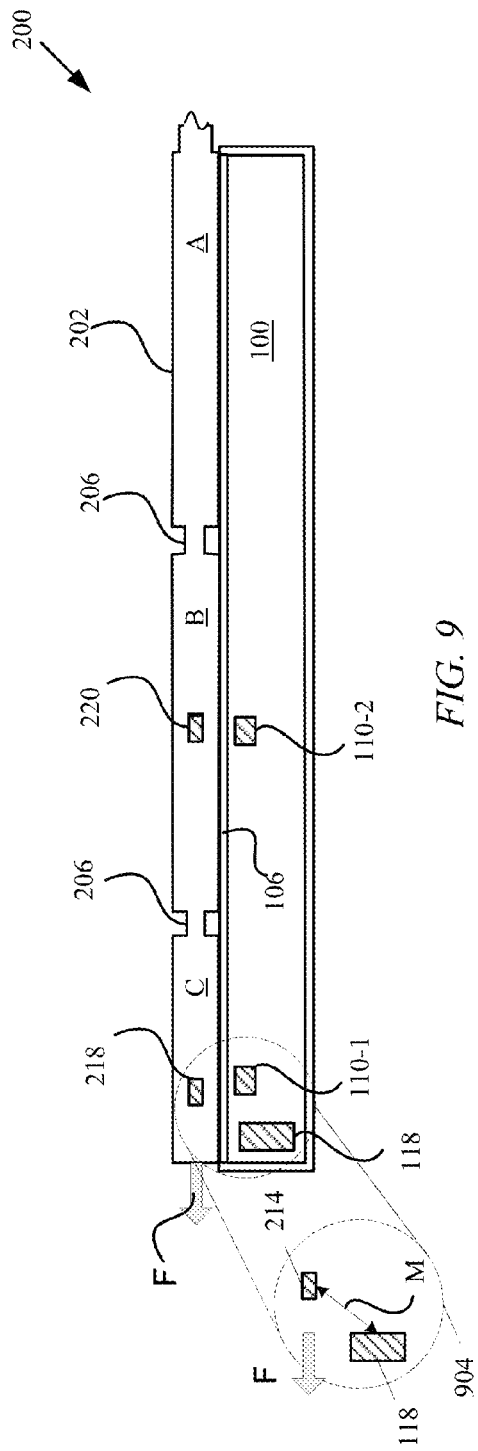
FIGS. 9-11 show representative cross sectional views of cover magnetically attached to tablet device.
Figure 10:
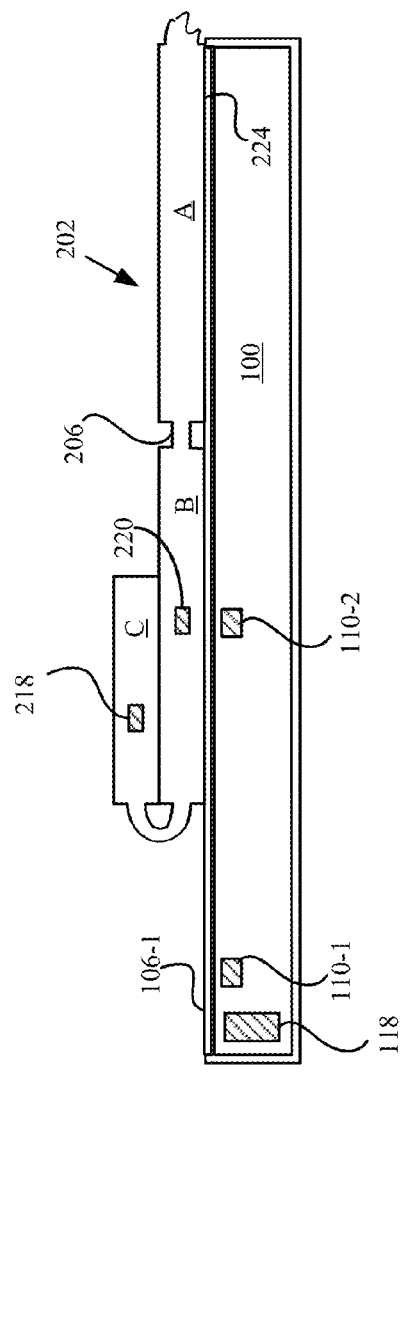
Figure 11:
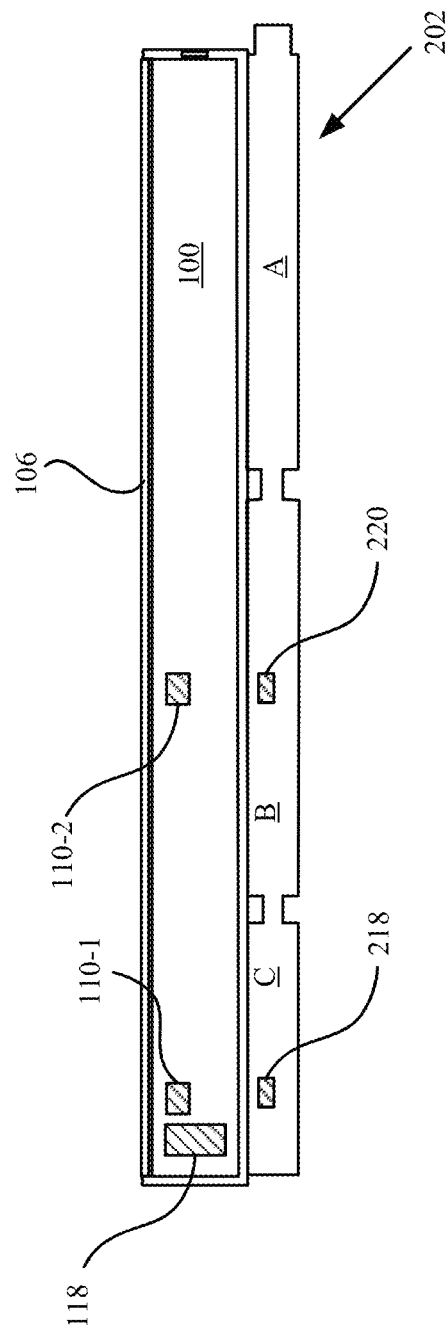

FIGS. 9-11 show representative cross sectional views of cover 200 magnetically attached to tablet device 100. In particular, FIG. 9 shows cover 200 in fully closed configuration 900 in which an interior surface of flap 202 comes in full contact with protective layer 106. Hall Effect sensor 110-1 can detect a magnetic field provided by sensor magnet 218. Concurrently Hall Effect sensor 110-2 can detect a magnetic field provided by sensor magnet 220. In this way, the processor can use the detection information provided by Hall Effect sensors 110 to determine a spatial relationship between cover 200 and tablet device 100. More specifically, when flap 202 is foldable and/or includes segments (such as A, B, C), then the processor in tablet device 100 can use detection information provided by sensors 110 to determine a folded configuration of cover 200. For example, using the detection information from Hall Effect sensors 110 the processor can determine that cover 200 is in fully closed configuration 900 such that no visual content presented by a display disposed in tablet device 100 is viewable and can thus alter an operating state of tablet device 100 accordingly.

It should also be noted that tablet device 100 can include magnets 118 that can be used to form a magnetic attachment with flap attachment magnets 214. In one embodiment, magnet 118 can take the form of a bar magnet positioned in such a way as to "throw" magnetic flux lines through protective layer 106 with a flux density sufficient to magnetically interact with flap attachment magnets 214. In one embodiment, in order to maintain the interior surface of flap 202 in close contact with protective layer 106, magnet 118 can be placed a distance away from flap attachment magnet 214 in the closed configuration. Therefore by intentionally "mis-aligning" magnets 118 and 214, a net force F can be applied to flap 202 that pulls on flap 202 in such a way as to force flap 202 onto protective layer 106 as illustrated in insert 904 where F is a resultant force vector of the magnetic attraction force M between magnets 118 and 214.

FIG. 10 shows partially open configuration 1000 where segment C is folded away from protective layer 106 in such a way that portion 106-1 of protective layer 106 is exposed rendering any visual content presented by the display viewable only in portion 106-1. Hall Effect sensor 110-1 cannot detect the magnetic field provided by sensor magnet 218 whereas sensor 110-2 can still detect magnet 220. In this cay, the processor can use detection information from sensor 110-2 (detection) in combination with information and sensor 110-1 (no detection) to deduce that only segment C is folded away from protective layer 106 revealing portion 106-1. In this way, only that portion of the display corresponding to portion 106-1 is viewable. In one embodiment, the processor can cause the display to present visual content in accordance with an amount of display deemed to be viewable.

FIG. 11 show embodiments whereby cover 200 is folded in such a way that interior surface 224 is in contact with rear surface of tablet device 100 in what can be referred to as reverse folded configuration can be useful in those situations where tablet device 100 includes a camera or other such imaging device. In this way, a user can hold tablet device 100 using the reverse folded configuration enabling use the display assembly as a viewfinder that can be used to compose an image or video. It should be noted that magnetic detection circuits such as Hall Effect sensor 110-1 and Hall Effect sensor 110-2 can be configured in such a way that in reverse folded configuration, at least one of the magnetic detection circuits can detect a corresponding magnet in cover 200. For example, in the reverse folded configuration, Hall Effect sensor 110-1 can detect sensor magnet 218.

Figure 12:
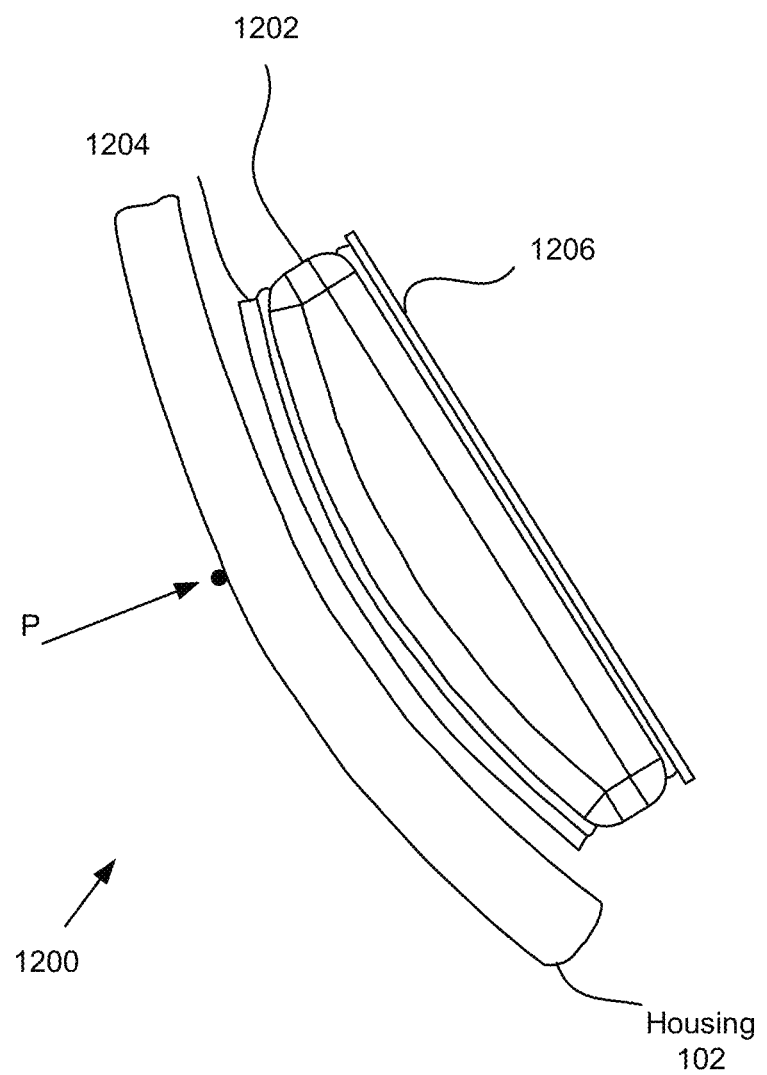
FIG. 12 shows a cross section of a magnetic attachment system.

FIG. 12 is a side view of magnetic assembly 1200 and housing 102 in accordance with an embodiment described in the specification. Magnetic assembly 1200 can include magnets 1202, magnetic shield 1204 and rear shield 1206 can be used to shunt magnetic field lines away from an interior of tablet device 100 and towards housing 102. In the inactive state, magnetic flux density measured at point P along an external surface of housing 102 can be less than $B_{threshold}$ as described above. More specifically, regions of high magnetic flux at corners of magnet 1202 can be reduced by rounding. In this way, magnetic flux density at the corners is substantially reduced thereby providing a more uniform magnetic flux distribution at an exterior surface of housing 102. In particular, at least one portion of magnet 1202 can be shaped to closely match or conform to a portion of housing 102. Matching the shape of magnet 1202 to housing 102 can enable the positioning of magnet 1202 to be relatively close to an inside edge of housing 102 thereby increasing a magnetic flux density at the exterior surface of housing 102 in an active state. In this way, an optimal magnetic attraction can be created with external magnetic elements.

Figure 13:
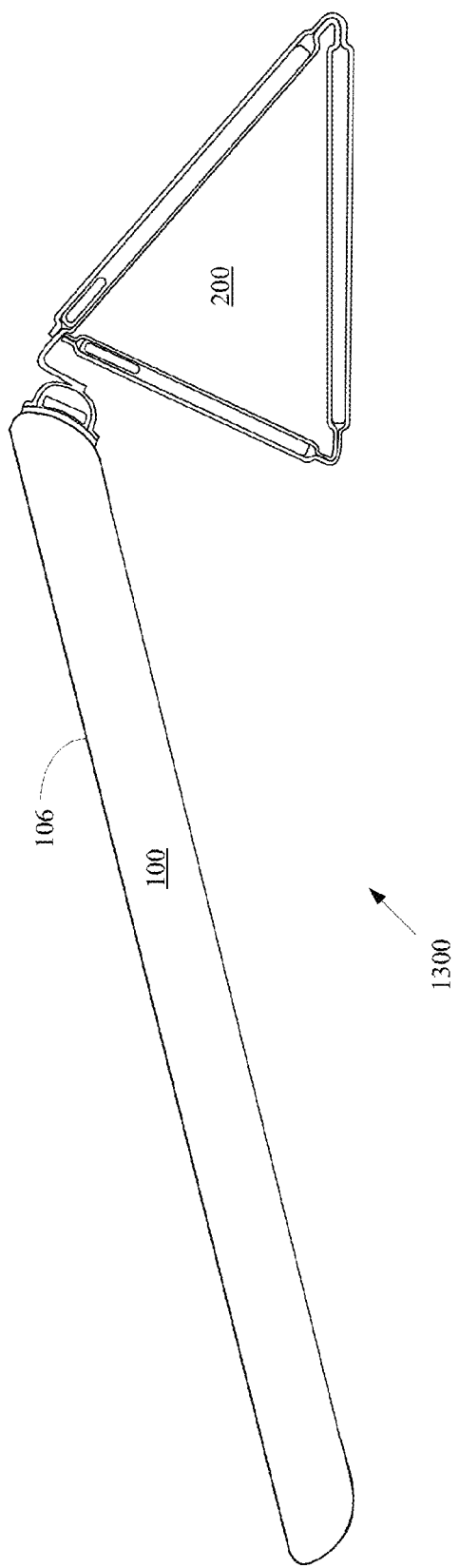
FIGS. 13-14 shows side and perspective views of the segmented cover configured to support a tablet device in a display state.

FIG. 13 shows a side view of a cover 200 configured to support tablet device 100 in keyboard configuration using triangular structure 1300. Cover 200 can be folded into triangular structure 1300 by bringing segment A and C in proximity to each other (it should be noted that a friction coupling between the segments can also suffice to form triangular structure 1300). Triangular structure 1300 can be used to support tablet device 100 in such a way that a touch sensitive surface disposed beneath protective layer 106 is positioned relative to a support surface at an ergonomically advantageous angle. This is particularly relevant in those situations where the touch sensitive surface is used over an extended period of time. For example, a virtual keyboard can be presented at the touch sensitive surface. In the described embodiment, tablet device 100 can be angled with respect to a horizontal support surface in the range of 5° to 15°.

Figure 14:
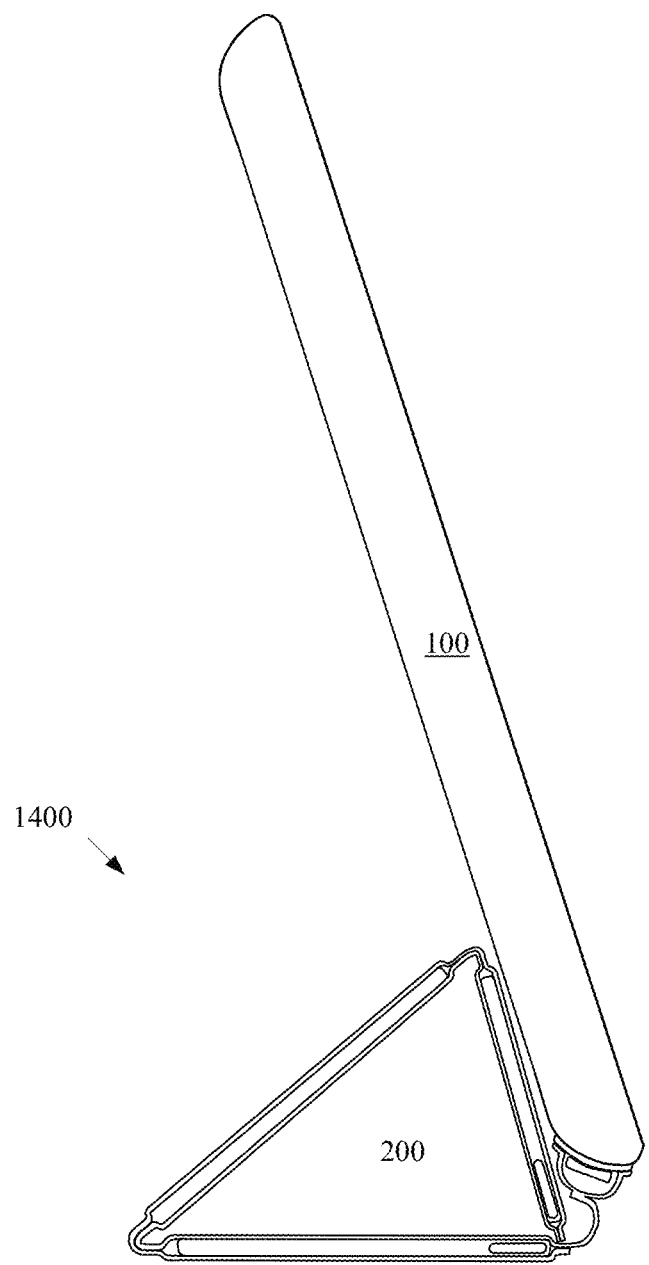

FIG. 14 shows folded configuration of cover 200 in which triangular support structure 1400 can be used to support tablet device 100 in a viewing mode. By viewing mode it is meant that triangular structure 1400 can support tablet device 100 in such a way that the display assembly can present visual content (visual, stills, animation, etc.). For example, triangular support structure 1400 can support tablet device 100 with respect to a horizontal support surface such that tablet device 100 can present visual content at a presentation angle of about 65° to about 85° (referred to "kickstand" state suitable for easy viewing).

Figure 15:
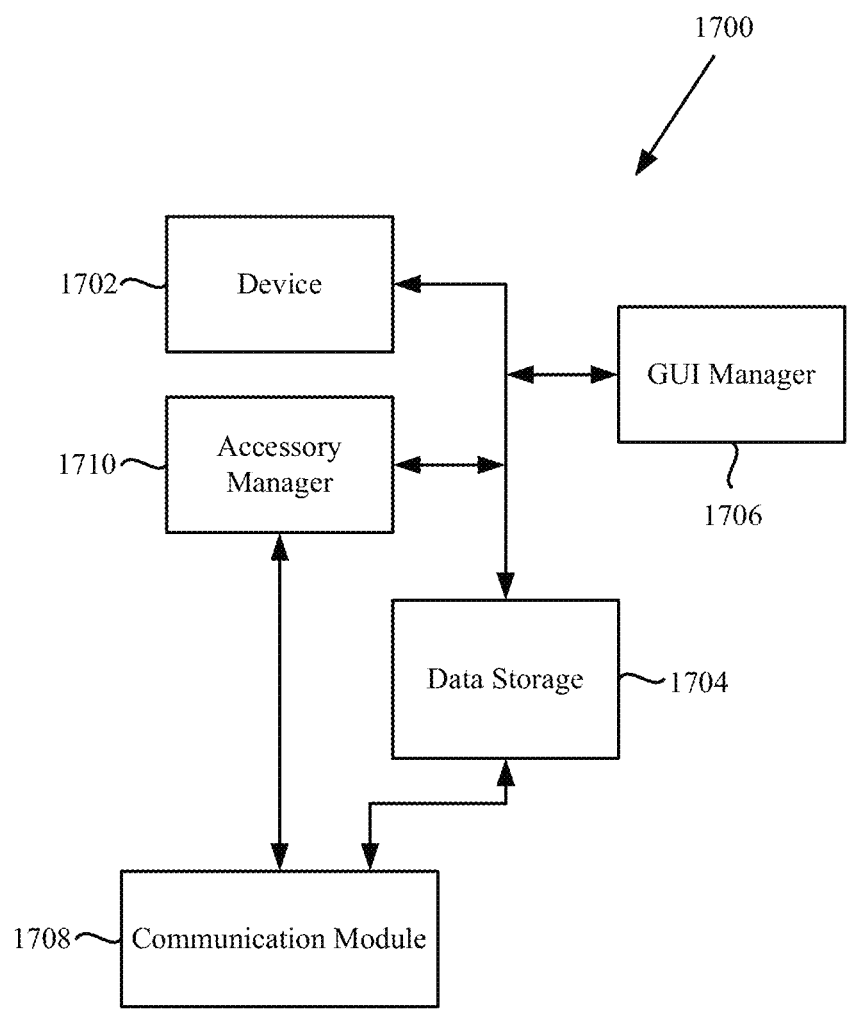
FIG. 15 is a block diagram of an arrangement of functional modules utilized by a portable media device.

FIG. 15 is a block diagram of an arrangement 1700 of functional modules utilized by an electronic device. The electronic device can, for example, be tablet device 100. The arrangement 1700 includes an electronic device 1702 that is able to output media for a user of the portable media device but also store and retrieve data with respect to data storage 1704. The arrangement 1700 also includes a graphical user interface (GUI) manager 1706. The GUI manager 1706 operates to control information being provided to and displayed on a display device. The arrangement 1700 also includes a communication module 1708 that facilitates communication between the portable media device and an accessory device. Still further, the arrangement 1700 includes an accessory manager 1710 that operates to authenticate and acquire data from an accessory device that can be coupled to the portable media device.

Figure 16:
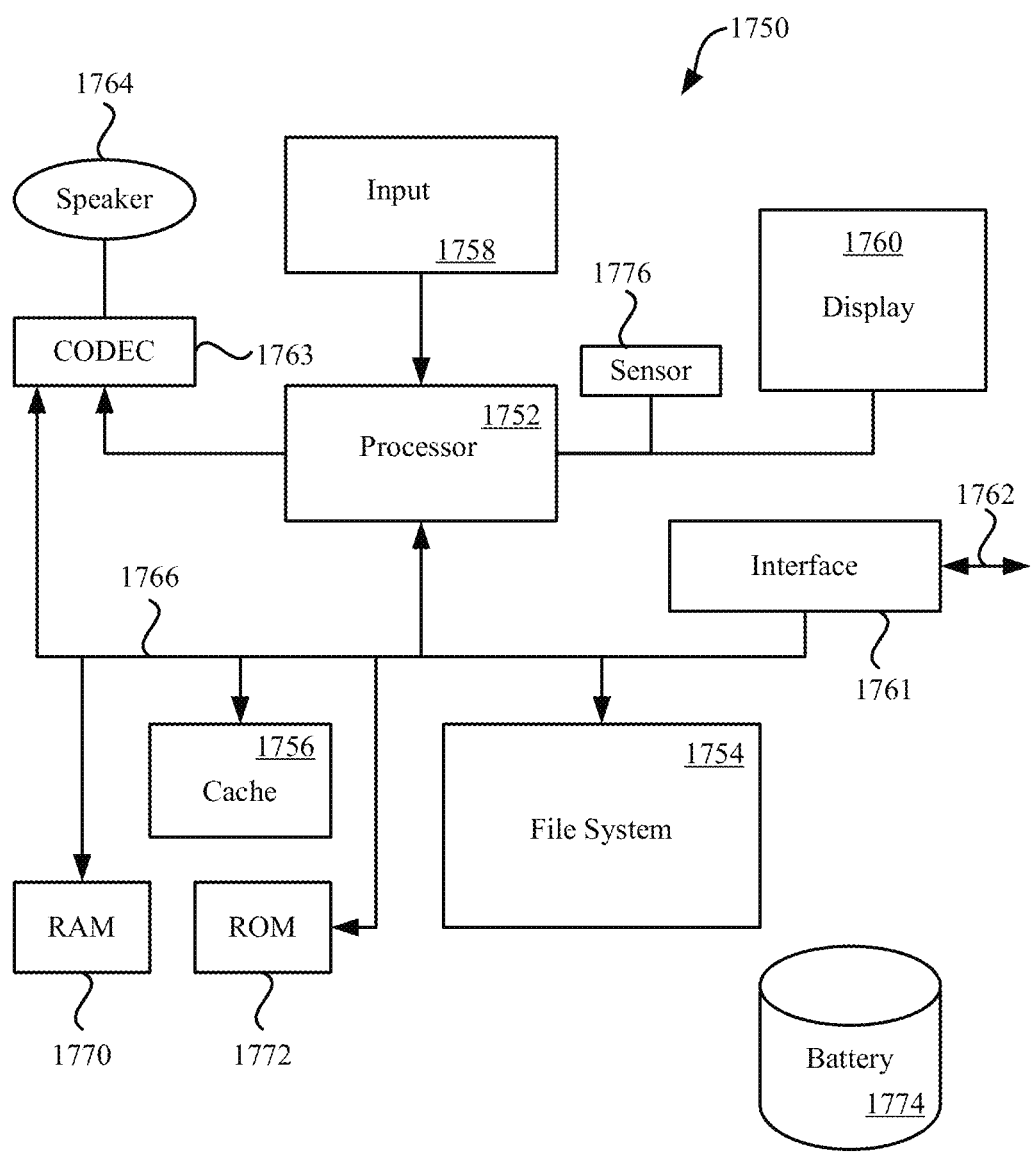
FIG. 16 is a block diagram of an electronic device suitable for use with the described embodiments.

FIG. 16 is a block diagram of an electronic device 1750 suitable for use with the described embodiments. The electronic device 1750 illustrates circuitry of a representative computing device. The electronic device 1750 includes a processor 1752 that pertains to a microprocessor or controller for controlling the overall operation of the electronic device 1750. The electronic device 1750 stores media data pertaining to media items in a file system 1754 and a cache 1756. The file system 1754 is, typically, a storage disk or a plurality of disks. The file system 1754 typically provides high capacity storage capability for the electronic device 1750. However, since the access time to the file system 1754 is relatively slow, the electronic device 1750 can also include a cache 1756. The cache 1756 is, for example, Random-Access Memory (RAM) provided by semiconductor memory. The relative access time to the cache 1756 is substantially shorter than for the file system 1754. However, the cache 1756 does not have the large storage capacity of the file system 1754. Further, the file system 1754, when active, consumes more power than does the cache 1756. The power consumption is often a concern when the electronic device 1750 is a portable media device that is powered by a battery 1774. The electronic device 1750 can also include a RAM 1770 and a Read-Only Memory (ROM) 1772. The ROM 1772 can store programs, utilities or processes to be executed in a non-volatile manner. The RAM 1770 provides volatile data storage, such as for the cache 1756.

The electronic device 1750 also includes a user input device 1758 that allows a user of the electronic device 1750 to interact with the electronic device 1750. For example, the user input device 1758 can take a variety of forms, such as a button, keypad, dial, touch screen, audio input interface, visual/image capture input interface, input in the form of sensor data, etc. Still further, the electronic device 1750 includes a display 1760 (screen display) that can be controlled by the processor 1752 to display information to the user. A data bus 1766 can facilitate data transfer between at least the file system 1754, the cache 1756, the processor 1752, and the CODEC 1763.

In one embodiment, the electronic device 1750 serves to store a plurality of media items (e.g., songs, podcasts, etc.) in the file system 1754. When a user desires to have the electronic device play a particular media item, a list of available media items is displayed on the display 1760. Then, using the user input device 1758, a user can select one of the available media items. The processor 1752, upon receiving a selection of a particular media item, supplies the media data (e.g., audio file) for the particular media item to a coder/decoder (CODEC) 1763. The CODEC 1763 then produces analog output signals for a speaker 1764. The speaker 1764 can be a speaker internal to the electronic device 1750 or external to the electronic device 1750. For example, headphones or earphones that connect to the electronic device 1750 would be considered an external speaker.

The electronic device 1750 also includes a network/bus interface 1761 that couples to a data link 1762. The data link 1762 allows the electronic device 1750 to couple to a host computer or to accessory devices. The data link 1762 can be provided over a wired connection or a wireless connection. In the case of a wireless connection, the network/bus interface 1761 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or visual content. Sensor 1776 can take the form of circuitry for detecting any number of stimuli. For example, sensor 1776 can include a Hall Effect sensor responsive to external magnetic field, an audio sensor, a light sensor such as a photometer, and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is defined as any data storage device that can store data that can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. A cover suitable for attaching to and protecting a tablet device, the tablet device having a housing with a front opening and a display carried by the housing with an outer protective layer having a size and a shape that at least overlays the display and that fills the front opening, the cover comprising:
   a flap having the size and the shape of the display that is foldable into a folded configuration, comprising:
      a linear array of magnets positioned along and parallel to a first edge of the flap at least some of which provide a first magnetic field arranged to secure the flap to the outer protective layer,
      a sensor magnet disposed at a location in the flap between the first edge and a second edge opposite the first edge, the sensor magnet having a size and a shape such that the sensor magnet remains detectable by a sensor carried by the tablet device regardless of an amount of rotational displacement of the sensor magnet with respect to the outer protective layer in accordance with a maximum racking angle when the flap is coupled to the outer protective layer by the linear array of magnets, and
      a field shaping magnet disposed at a location in the flap between the linear array of magnets and the second edge, wherein the field shaping magnet reduces a magnetic field at a location of a magnetically sensitive component carried by the housing when the linear array of magnets secures the flap to the outer protective layer.

2. The cover as recited in claim 1, the cover further comprising:
   a linear array of magnets arrayed along and parallel to a second edge of the flap opposite the first edge, wherein the linear array of magnets along the second edge of the flap are parallel to a sub-set of the linear array of magnets at the first edge.

3. The cover as recited in claim 2, wherein each of the linear array of magnets at the second edge forms a magnetic circuit with a corresponding one of the sub-set of magnets at the first edge when the flap is folded into a shape such that only the first edge is in contact with the cover in proximity to the second edge.

4. The cover as recited in claim 3, wherein none of the magnets at the first or second edges overlap each other to form the magnetic circuit.

5. The cover as recited in claim 4, wherein the shape forms a support structure suitable for supporting the tablet device in an operational configuration.

6. The cover as recited in claim 5, wherein the magnetic circuit provides sufficient magnetic attractive force to maintain the support structure while supporting the tablet device in the operational configuration.

7. The cover as recited in claim 2, further comprising:
   a magnetic hinge assembly at the second edge and comprising a flexible hinge portion, the hinge portion being a continuation of the flap beyond the second edge; and
   a magnetic attachment unit configured to form a releasable magnetic attachment with the tablet device.

8. The cover as recited in claim 7, wherein the magnetic hinge assembly allows the flap to pivot with respect to the outer protective layer from a closed configuration comprising the flap being secured to the outer protective layer to a reverse folded configuration comprising at least a portion of the flap being in contact with a back portion of the housing.

9. The cover as recited in claim 1, wherein the magnetically sensitive component is a magnetometer.

10. The cover as recited in claim 9, wherein the magnetometer operates as a magnetic compass.

11. The cover as recited in claim 1, wherein the sensor magnet comprises a first sensor magnet, and further comprising:
   a second sensor magnet disposed at a second location in the flap that is detectable by a second sensor disposed in the tablet device when a corresponding portion of the flap is in contact with the outer protective layer.

12. The cover as recited in claim 11, wherein the detection of the first and second sensor magnet by the first sensor indicates that the flap is secured to the outer protective layer by the linear array of magnets at the first edge.

13. The cover as recited in claim 12, wherein when the first sensor magnet is not detected and the second sensor magnet is detected indicates that only the portion of the flap corresponding to the second sensor magnet is in contact with the outer protective layer.

14. The cover as recited in claim 13, wherein a processor carried by the tablet device and coupled to the first and the second sensors uses the detection of the first and/or second sensor magnets to alter an operating state of the tablet device.

15. The cover as recited in claim 11, the size and the shape of the first and second sensor magnets are such that when the flap is secured to the outer protective layer by the linear array of magnets, the first and second sensor magnets remain detectable by the first and second sensors, respectively.

16. The cover as recited in claim 15, wherein the first and second sensor magnets remain detectable as long as the rotational displacement corresponds to a racking angle that is less than the maximum racking angle.

17. The cover as recited in claim 15, wherein the first and the second magnetic sensor magnets are not detected by the first and second sensors then the racking angle is greater than the maximum racking angle.

18. The cover as recited in claim 17, wherein a false trigger is initiated when the racking angle is greater than the maximum racking angle.

19. The cover as recited in claim 7, the tablet device further comprising:
   a magnetic attachment mechanism carried by the housing suitable for releasably attaching to the magnetic attachment unit, comprising:
   paired magnetic elements comprising a body comprising a magnetizable material having a shape that conforms to an interior surface of the housing, wherein the paired magnetic elements are magnetized in situ such that a first portion of the body comprises a first magnetic polarity and a second portion of the body comprises a second magnetic polarity, opposite the first magnetic polarity.

20. The cover as recited in claim 19, the magnetic attachment unit comprising paired magnetic elements each comprising a body comprising magnetizable material, and that are magnetized in situ such that a first portion of the body comprises the second magnetic polarity and a second portion of the body comprises the first magnetic polarity.

21. The cover as recited in claim 20, the paired magnetic elements carried by the magnetic attachment mechanism and carried by the magnetic attachment unit form a magnetic circuit suitable for securing the cover to the tablet device in a pre-determined position and orientation relative to each other.

22. A cover suitable for attaching to and protecting a tablet device, the table device having a housing with a front opening and a display carried by the housing with an outer protective layer having a size and a shape that at least overlays the display and that fills the front opening, the cover comprising:
- a flap having the size and the shape of the display, wherein the flap is foldable into a folded configuration and includes:
  - a linear array of magnets positioned along and parallel to a first edge of the flap at least some of which provide a first magnetic field arranged to secure the flap to the outer protective layer,
  - a field shaping magnet located a distance away from the linear array of magnets, the field shaping magnet providing a second magnetic field that reduces the first magnetic field at a position on the flap that is closest to a location of a magnetically sensitive component carried by the housing when the linear array of magnets secures the flap to the outer protective layer,
  - a first sensor magnet disposed at a first location between the first edge and a second edge opposite the first edge in the flap, the first sensor magnet being detectable by a first sensor carried by the tablet device when the flap is secured to the outer protective layer by the linear array of magnets, and
  - a second sensor magnet disposed at a second location proximal the first sensor magnet in the flap, the second sensor magnet being detectable by a second sensor disposed in the tablet device when a corresponding portion of the flap is in contact with the outer protective layer, wherein the first and second sensor magnets each have a size and shape in accordance with a rotational displacement of the flap with respect to the outer protective layer, the rotational displacement corresponding to a maximum racking angle of a pivoting type movement.

* * * * *